US007085966B2

(12) United States Patent
Luick (10) Patent No.: US 7,085,966 B2
(45) Date of Patent: Aug. 1, 2006

(54) METHODS AND ARRANGEMENTS FOR REPAIRING PORTS

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 10/670,712

(22) Filed: Sep. 25, 2003

(65) Prior Publication Data

US 2005/0081124 A1   Apr. 14, 2005

(51) Int. Cl.
  *G06F 11/00* (2006.01)
(52) U.S. Cl. .......................... 714/43; 714/10; 714/56; 712/220; 711/162
(58) Field of Classification Search .................. 714/9, 714/10, 43, 56; 712/220; 711/162
See application file for complete search history.

(56) References Cited

U.S. PATENT DOCUMENTS

| 4,633,440 | A | * | 12/1986 | Pakulski ................ 365/189.05 |
| 5,086,500 | A | * | 2/1992 | Greub ........................ 713/401 |
| 5,485,576 | A | * | 1/1996 | Fee et al. .................... 714/56 |
| 5,793,944 | A | * | 8/1998 | Luick ........................... 714/15 |
| 5,812,564 | A | * | 9/1998 | Bonke et al. ................ 714/769 |
| 6,578,158 | B1 | * | 6/2003 | Deitz et al. ................... 714/11 |
| 6,766,393 | B1 | * | 7/2004 | Zack ........................... 710/74 |
| 6,851,020 | B1 | * | 2/2005 | Matsumoto et al. ........ 711/112 |
| 6,981,174 | B1 | * | 12/2005 | Hanning ....................... 714/5 |
| 7,013,357 | B1 | * | 3/2006 | Murdock et al. ........... 710/240 |
| 2002/0199084 | A1 | * | 12/2002 | Choquette et al. .......... 712/215 |

* cited by examiner

*Primary Examiner*—Robert Beausoliel
*Assistant Examiner*—Emerson Puente
(74) *Attorney, Agent, or Firm*—Patterson & Sheridan LLP (57) ABSTRACT

Methods and systems for repairing ports are disclosed. Embodiments may detect a hard failure of a port, select an alternative port from existing ports in use within an array, and share the alternative port to route operands bound for the first port and the alternative port, to transmit operands associated with the failed port to the corresponding destination unit. Embodiments include an additional wire, or an alternative port path, that couples the alternative port to the destination unit that is associated with the first port. For instance, in a multi-pipeline processor, an operand of an instruction that is bound for the failed read port may be routed via an alternative read port to the corresponding execution unit. Similarly, data bound for failed write ports may be, e.g., written back to a register file by routing the data via an alternative write port of the register file.

27 Claims, 5 Drawing Sheets

METHODS AND ARRANGEMENTS FOR REPAIRING PORTS

BACKGROUND OF THE INVENTION

1. Field of the Invention

The present invention generally relates to the field of multi-port arrays within integrated circuit (IC) chips of computer systems. More particularly, the present invention relates to methods and arrangements for repairing ports such as read ports and write ports of multi-port arrays that fail as a result of, e.g., hard, uncorrectable failures.

2. Description of the Related Art

The competitive nature of industries has increased reliance on computer systems to perform daily operations, increasing the demand for fast and reliable computer systems with reasonable size and space requirements. The speed, or processing power, of computer systems in the same or smaller packages has led contemporary computer designs toward smaller IC chips that operate at higher frequencies, inherently increasing power densities within the IC chips. However, the higher frequencies and increased power densities also decrease reliability.

The decreased reliability has led many manufacturers toward autonomic computing designs. Autonomic computing refers to computer systems that configure themselves to changing conditions and are self healing in the event of failure. For instance, if one server in a rack of servers fails, the workload for the failed server may be shifted to another server in the rack, allowing operations to continue, albeit, possibly with lower processing capability and, potentially, at a slower processing rate. Nonetheless, fewer failures are catastrophic and less human intervention is required for routine operation.

Autonomic designs may also be incorporated on the IC chip level by incorporating redundant systems of subcomponents for subcomponents that tend to fail such as ports of arrays like register files. For example, ports of registers or register files within instruction pipelines of processors tend to fail more often within increases in power densities and frequencies.

Register files typically refer to combinations registers that store instructions for execution by execution units within a processor. Register files include multiple ports to allow other devices to write to and read from the registers or array locations. When an instruction is written to write ports of a register file, logic within the register file interprets part of the instruction, referred to as an operand, to determine what to do with the remainder of the instruction. For instance, an operand of an instruction may include instructions for the register file to initiate logic to store data of another operand to an address within the register file and/or to retrieve data from an address within the register file.

Instructions may also include operands for execution by other devices such as the execution units. Arrays such as register files communicate with the execution units via read ports. Read ports typically include a buffer to maintain operands and logic of the register file may direct operands of an instruction from the write ports to the read ports for execution by execution units. For example, an instruction having multiple operands may be written to write ports of a register file. In response, logic of the register file may forward one or more of the operands to read ports to transmit the operands to an execution unit. After the execution unit processes the operands, the resulting data may be written back to the register file at the same time that a target address is written to write port of the register file. The target address may indicate a location within the register file to store the resulting data so the resulting data may be accessed by instructions subsequently received by the register file.

However, when a port such as a write port or a read port fails, the failed port may erroneously interpret operands or provide erroneous operands to execution units. As a result instructions transmitted to the register file will execute improperly if at all. To avoid such situations, processor designs implement error detection logic to check the parity of instructions received via write ports and to incorporate parity bits in operands forwarded to read ports. A mismatch between an expected parity bit and a received parity bit may indicate an erroneous data transmission possibly caused by a failed port. Instruction pipelines that utilize a failed port can then be turned off, which significantly impacts processing capacity and capabilities.

An alternative solution, which avoids such a significant impact on processing capacity and capabilities, involves provision of redundant ports through which operands or data may be routed. Redundant ports are ports that sit idle until a port fails. When a port fails, each redundant port substitutes for one failed port of the same type. In particular, one redundant write port can take over the functionality of one failed write port and one redundant read port can take over the functionality of one failed read port. Thus, the processor can continue to route instructions through a pipeline until the number of failed read ports or write ports exceeds the number of the redundant read ports or write ports, respectively.

Adding redundant ports in an IC chip such as a processor, however, can significantly impact costs of manufacture and performance by adding a significant amount of wire to the IC chip. Depending upon the number of metallization layers available within, e.g., a processor, adding redundant ports can involve a linear expansion of silicon area, which significantly impacts the costs of manufacturing the processor and the speed with which instructions can be processed by the processor. For example, increasing the number of ports in an array from three ports to four ports may increase the silicon area utilized by a register file by approximately four-thirds and slow down the corresponding pipeline's processing speed by approximately the square root of that ratio, or 15 percent. As a further illustration, adding two additional read ports and one additional write port would increase a three port array to a six port array, substantially doubling the area consumed and reducing the processor's performance by approximately 30 percent.

Therefore, there is a need for methods and arrangements for repairing ports with reduced impact on performance and area requirements.

SUMMARY OF THE INVENTION

Embodiments of the invention generally provide methods and systems for repairing ports. One embodiment provides an apparatus for repairing ports of an array to execute instructions. The apparatus generally includes error logic to determine if a first port of the ports fails; a swap controller responsive to the error logic to selectively move a first bit to a position of a second bit within the instructions, the position of the second bit being associated with the a second port of the ports via the array, to alternate output from the second port between the first bit and the second bit when the first port fails and execution of at least one of the instructions depends upon transmission of the first bit from the array; and a destination unit coupled with the ports, being responsive to the swap controller to selectively receive the first bit from the first port via a first port path and the first bit from the second port via an alternative port path, to execute the instructions.

Another embodiment provides a system for repairing ports. The system may include memory to store instructions; a register file coupled with the memory to receive the instructions for execution, wherein the register file comprises a first port to transmit a first operand of the instructions and a second port to alternate between transmitting a second operand of the instructions and the first operand, based upon positions of the operands in the instructions; error logic to determine if the first port failed; a swap controller coupled with the error logic to route the instructions through more than one pipelines for parallel execution, selecting at least one of the instructions and positions of the operands within the at least one of the instructions, to route the first operand to the second port in response to a failure of the first port; and an execution unit coupled with the first port via a first port path and the second port via an alternative port path, being responsive to the swap controller to selectively receive the first operand from the second port via the alternative port path when the first operand is routed to the second port.

A further embodiment provides a method for repairing ports of an array. The method may include monitoring transmission from a first port of the ports to determine when the first port fails; selectively routing a first bit bound for the first port to a second port of the ports in response to determining that the first port failed when execution of an instruction associated with the first bit depends upon receipt of the first bit by a destination unit; receiving the first bit from the second port via an alternative port path when the first bit is routed to the second port; and receiving a second bit from the second port via a second port path when the second bit is routed to the second port.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The following is a detailed description of embodiments of the invention depicted in the accompanying drawings. The embodiments are examples and are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and systems for repairing ports are contemplated. Embodiments may detect a hard failure of a port, select an alternative port from existing ports in use within an array, and share the alternative port to route operands bound for the first port and the alternative port, to transmit operands associated with the failed port to the corresponding destination unit. Embodiments include an additional wire, or an alternative port path, that couples the alternative port to the destination unit that is associated with the first port. For instance, in a multi-pipeline processor, an operand of an instruction that is bound for the failed read port may be routed via an alternative read port to the corresponding execution unit such as a fixed point unit (FXU), a load/store unit (LSU), a floating point unit (FPU), an arithmetic logic unit (ALU), or other type of execution unit. Similarly, data bound for failed write ports may be, e.g., written back to a register file by routing the data via an alternative write port of the register file.

While specific embodiments will be described below with reference to a multi-pipeline processor, those of skill in the art will realize that embodiments of the present invention may advantageously be implemented in other apparatus having multi-port arrays or register files such as digital signal processors (DSPs), graphics processing units (GPUs), differential memory arrays, and the like. More generally, even though the discussions below describe the data in terms of operands, which often relates to instructions and can include one or more bits of data, operands should be construed to apply to any general data in any type of system that utilizes porting.

Figure 1:
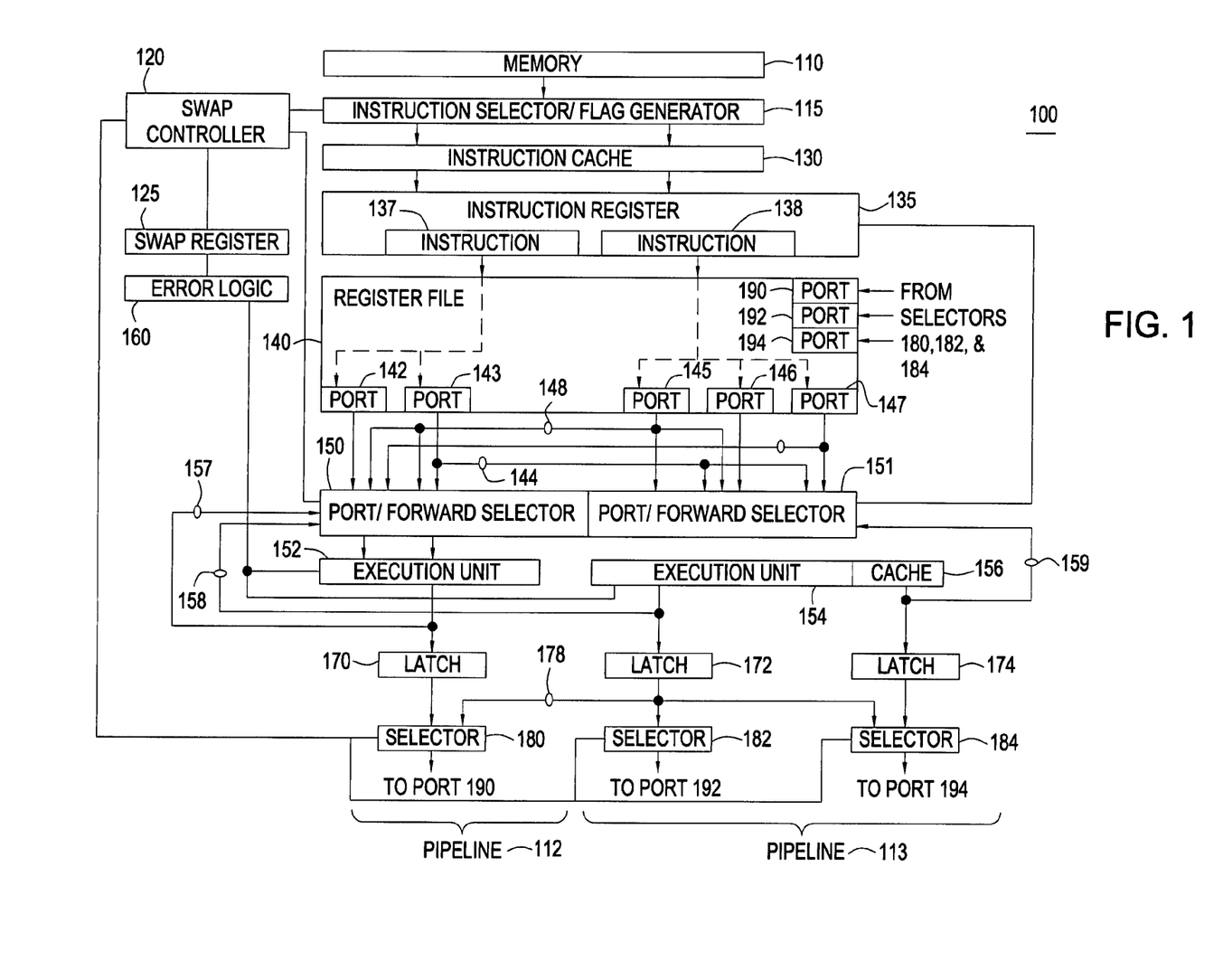
FIG. 1 is an embodiment of a system including a memory and processor pipelines adapted to repair failed read and write ports.

Turning now to the drawings, FIG. 1 depicts an embodiment of a system 100 for repairing ports. System 100 may process instructions from memory 110 via two pipelines 112 and 113. In a simple situation, for example, when no ports have failed, two instructions may be selected from memory 110 to execute in parallel and stored instruction cache 130. The two instructions may then be decoded by instruction register 135, one decoded instruction being stored in instruction 137 and the other decoded instruction being stored in instruction 138. The decoded instructions are then transmitted to register file 140 wherein logic of register file 140 forwards two operands of instruction 137 to ports 142 and 143, and three operands of instruction 138 to ports 145, 146, and 147. The operands in ports 142 and 143 are then selected and forwarded to execution unit 152 by port/forward selector 150. Substantially simultaneously, the operands in ports 145, 146, and 147 are selected and forwarded to execution unit 154 by port forward selector 151, to execute both instructions 137 and 138 in parallel. The resulting data from execution units 152 and 154 may then be written back to ports 190, 192, and 194 of register file 140 via latches 170, 172, and 174, and selectors 180, 182, and 184, respectively.

In other situations, for example, only one operand of instruction 137 may be forwarded to execution unit 150 and/or less than three operands of instruction 138 may be forwarded to execution unit 151, leaving one or more the read ports unused during cycles in the execution stage. Further, resulting data such as carry forwards 157, 158, and 159, that are being output from execution units 152 and 154 in response to prior instructions, may be used along with operands from instruction 137 and/or 138 to execute instructions 137 and 138. Thus, port/forward selectors 150 and 151 select the corresponding carry forward(s) and forward them along with operands to execution units 152 and 154.

More specifically, memory 110 may include any type of memory, such as random access memory (RAM) serving as cache, main memory, or other memory for system 100 and may contain instructions waiting to be processed via pipelines 112 and 113.

Pipelines 112 and 113 include sequential channels in which data, instructions, signals, or the like, are moved from one stage to the next, for example, decoding, issuing, and executing the instructions at different stages. In the present embodiment, pipelines 112 and 113 move two instructions through issue and execution stages in parallel. Pipelines 112 and 113 may include instruction selector/flag generator 115, instruction cache 130, instruction register 135, register file 140, port/forward selectors 150 and 151, execution units 152 and 154, latches 170, 172, and 174, and selectors 180, 182, and 184.

Instruction selector/flag generator 115 may select a pair of instructions from memory, such as the next pair of instructions in an instruction queue, to forward down pipelines 112 and 113 in parallel. In situations wherein one or more ports have failed, based upon the communication with swap controller 120, instruction selector/flag generator 115 may select the same instruction to forward down both pipelines 112 and 113, may select different instructions based upon the number ports needed to transmit the instructions to execution units 152 and 154, may select a pair of instructions and swap positions of operands within one or both of the instructions, and/or may swap one or more operands between the pair of instructions. The selections and swaps are configured to route operands of the instructions to operational ports so one instruction can be executed by transmitting the operands of the instruction to an execution unit in series or in parallel, or two instructions can be executed in parallel. Instruction selector/flag generator 115 may also associate one or more flags with the pair of instructions to indicate when one or both of the instructions include operands referring to an instruction being processed in pipeline 112 and/or 113 so that carry forwards 157, 158, and/or 159 can be substituted for the corresponding operands.

Swap controller 120 may couple with swap register 125 to determine when one or more ports have failed and communicate with instruction selector/flag generator 115 to select and/or modify pairs of instructions. In particular, operands of the pairs of instructions, which are bound for the failed port(s), may be swapped with operands bound for alternative ports. For example, swap register 125 may include bits for one or more ports such as read ports 142, 143, 145, 146, and 147 and/or write ports 190, 192, and 194. If port 142 fails, a bit of swap register 125 may either indicate the failure or may indicate that port 145 is designated as a first alternative port for port 142. When a bit of swap register 125 indicates a failure without designating an alternative port, swap controller 120 may include logic to select an alternative port. Swap controller 120 may then communicate with instruction selector/flag generator 115 to swap operands of instructions subsequently received by instruction selector/flag generator 115 between pairs of instructions, to route the operand bound for port 142 to port 145 and vice versa. The instruction pair may then advantageously be processed with little or no added delay even though port 142 failed. In some embodiments, swap controller 120 may also couple with register file 140 to indicate swaps associated with write ports 190, 192, and 194 during write backs. In other embodiments, swap controller 120 may couple with other parts of the processor that generate target addresses for the write backs so the target addresses correspond to the correct write ports.

On the other hand, in situations where the operand of the instruction in pipeline 113, which is bound for port 145, is necessary for execution unit 154 to process that instruction, swap controller 120 may instruct instruction selector/flag generator 115 to route an instruction that does not use port 142 in parallel via pipeline 112 or route the instruction in pipelines 112 without a corresponding instruction being routed in parallel via 113. In many embodiments, less than five percent of the instructions may use port 145. Thus, instructions may advantageously be processed with less than a five percent reduction in processing speed.

Instruction cache 130 receives the instructions selected by instruction selector/flag generator 115 in program order, such as load, store, branch, and add. Register file 140, on the other hand, may require the instructions in a different order based upon the number and types of execution units in the pipelines, such as execution units 152 and 154. Thus, instruction register 135 aligns the pair of instructions issued from instruction cache 130 in the order required by register file 140 and stores the instructions with operands in the corrected order in instruction 137 for pipeline 112 and in instruction 113 for pipeline 113. Note that if operands of the pair of instructions have been swapped, instruction 138 may include, for example, an operand of instruction 137 and instruction 137 may include an operand for instruction 138. Thus, for example, the operand of instruction 138 that is included in instruction 137 may be routed to execution unit 154 via read port 142 or 143.

Further, when one or more flags associated with the pair of instructions indicate that the results of an instruction further down the pipeline is needed by an execution unit to execute the instruction(s), instruction register 135 may couple with port/forward selector 150 to select to corresponding carry forwards.

Register file 140 may receive and store instructions to be executed. When the execution units 152 and 154 are available to receive instructions, the corresponding operands are made available via read ports 142, 143, 145, 146, and 147. More specifically, when register file 140 receives instruction 137, one or more of the operands of instruction 137 may be latched to ports 142 and 143. Similarly, when register file 140 receives instruction 138, one or more of the operands of instruction 138 may be latched to ports 145, 146, and 147.

In situations wherein one of the read ports has failed, the operands, as received from instruction register 135, are already in a corrected order to route an operand bound for the failed port via an alternative port. For example, after port 142 fails and swap controller 120 causes an operand bound for port 142 to be swapped with an operand bound for port 145, register file 140 may latch the operand originally bound for port 142 to port 145 and vice versa.

Alternative port paths 144, 148, and 149 linking inputs of execution units with outputs of the alternative ports for transmitting operands of instructions 137 and 138. In the present embodiment, alternative port path 148 couples port 145 with inputs for ports 142, 143, and 146, such that port 145 may operate as alternative ports for ports 142, 143, and/or 146, if ports 142, 143, and/or 146 fail. Similarly, alternative port path 149 couples port 147 with an input for port 142, alternative port path 144 couples port 143 with inputs for ports 146 and 147, and alternative port path 178 couples latches 170, 172, and 174 with selectors 180, 182, and 184, respectively, to provide alternative port paths for write ports 190, 192, and 194, respectively. For instance, port 145 may operate as a primary alternative port, being shared for operands bound for both execution units 152 and 154 and port 147 may operate as a secondary alternative port for port 142, e.g., substituting for port 145 when port 145 also fails or when port 145 is being utilized to forward an operand to execution unit 154 and port 147 is not being utilized to forward an operand to execution unit 154. In other embodiments, other or additional combinations of alternative ports may be implemented with alternative port paths, advantageously offering multiple backup ports with little additional wiring and space requirements as compared with adding redundant ports to register file 140.

Ports selected to operate as alternative ports may be selected based upon, e.g., the number of instructions that utilize the ports and/or the frequency of use of instructions that use the ports. For instance, the frequency of use of ports may be estimated, determined by simulations, and/or heuristically determined.

Port/forward selectors 150 and 151 may include one or more switches or multiplexers (MUXs) that couple read ports 142, 143, 145, 146, and 147, and/or carry forwards 157, 158, and 159, with execution units 152 and 154. For instance, when port 142 has failed and port 145 is selected as an alternative port for port 142, alternative port path 148 transmits the corresponding operand to an input of port/forward selector 150. In many of these embodiments, port/forward selector 150 may receive a selection signal from swap controller 120 to select and couple the output of port 145 to execution unit 152 via alternative port path 148.

To further illustrate the operation of port/forward selectors 150 and 151, instruction 138 may include an operand that is a reference to a result of an instruction further down pipeline 113. Instruction selector/flag generator 115 may indicate the use of, e.g., carry forward 159 in place of the operand bound for port 145 by associating a flag associated with instruction 138. Instruction register 135 may transmit a selection signal to port/forward selector 151 to select carry forward 159. When instruction 138 is latched to ports 145, 146, and 147, port/forward selector 151 may couple carry forward 159 with execution unit 154 rather than port 145.

Execution units 152 and 154 may include execution units such as FXUs, FPUs, ALUs, adders, or the like, to process instructions 137 and 138. In the present embodiment, execution unit 154 may include a LSU coupled with cache 156 to perform load and store operations based upon operands of instruction 138 received via ports 145, 146, and 147. Execution unit 152, on the other hand, may include a FXU to perform a fixed-point operation on operands for instruction 137 received from ports 142 and 143. In further embodiments, more than two execution units of the same type and/or different types may be included in system 100 to facilitate more than two instruction pipelines.

In many embodiments, execution units 152 and 154 may perform error detection routines such as parity checks or checksums on operands received from ports such as read ports 142, 143, 145, 146, and 147. When a parity check fails to confirm the correct receipt of an operand of an instruction, e.g., an operand of instruction 137 via port 142, execution unit 152 may couple with error logic 160 to determine the source of the error.

Error logic 160 may receive an indication of an error associated with a port of an execution unit and include a software error handler that initiates diagnostic routines to determine the port associated with the error such as port 142 and to determine whether the error is a soft error, a correctable hard error, or an uncorrectable hard error. If error logic 160 determines that the error is an uncorrectable hard error, error logic 160 may set the appropriate bit in swap register 125. In many embodiments, error logic 160 may also couple with register file 140 to perform similar diagnostics for write ports such as ports 190, 192, and 194.

The results output by execution units 152 and 154 and cache 156 may couple with latches 170, 172, and 174, and carry forwards 157, 158, and 159, respectfully. Latches 170, 172, and 174 may maintain the outputs for write ports 190, 192, and 194, respectively. However, when write port 192 fails, alternative port path 178 may couple latch 172 with selectors 180 and 184 to route the data in latch 172 to write ports 190 or 194. Selectors 180, 182, and 184 may be responsive to swap controller 120 to selectively receive data directly from latches 170, 172, and 174 or from latch 172 via alternative port path 178. For example, register file 140 may couple with error logic 160 to indicate an error associated with a write port such as port 192. Similar to the handling of read ports 142, 143, 145, 146, and 147, error logic 160 may determine that the error is an uncorrectable hard error and set a corresponding bit in swap register 125. In such situations, swap controller 120 may transmit a selection signal to selector 180 or 184 to use the write port 190 or 194 as an alternative write port for the write port 192. Advantageously, the carry forwards 157, 158, and 159 couple from the outputs of execution units 152 and 154 and from cache 156 prior to latches 170, 172, and 174, which is prior to writing the results back to register file 140. Therefore, processing of instructions that utilize carry forwards 157, 158, and 159 may not be affected by a failure of port 182 or by routing the content of latch 172 via port 180.

Figure 2:
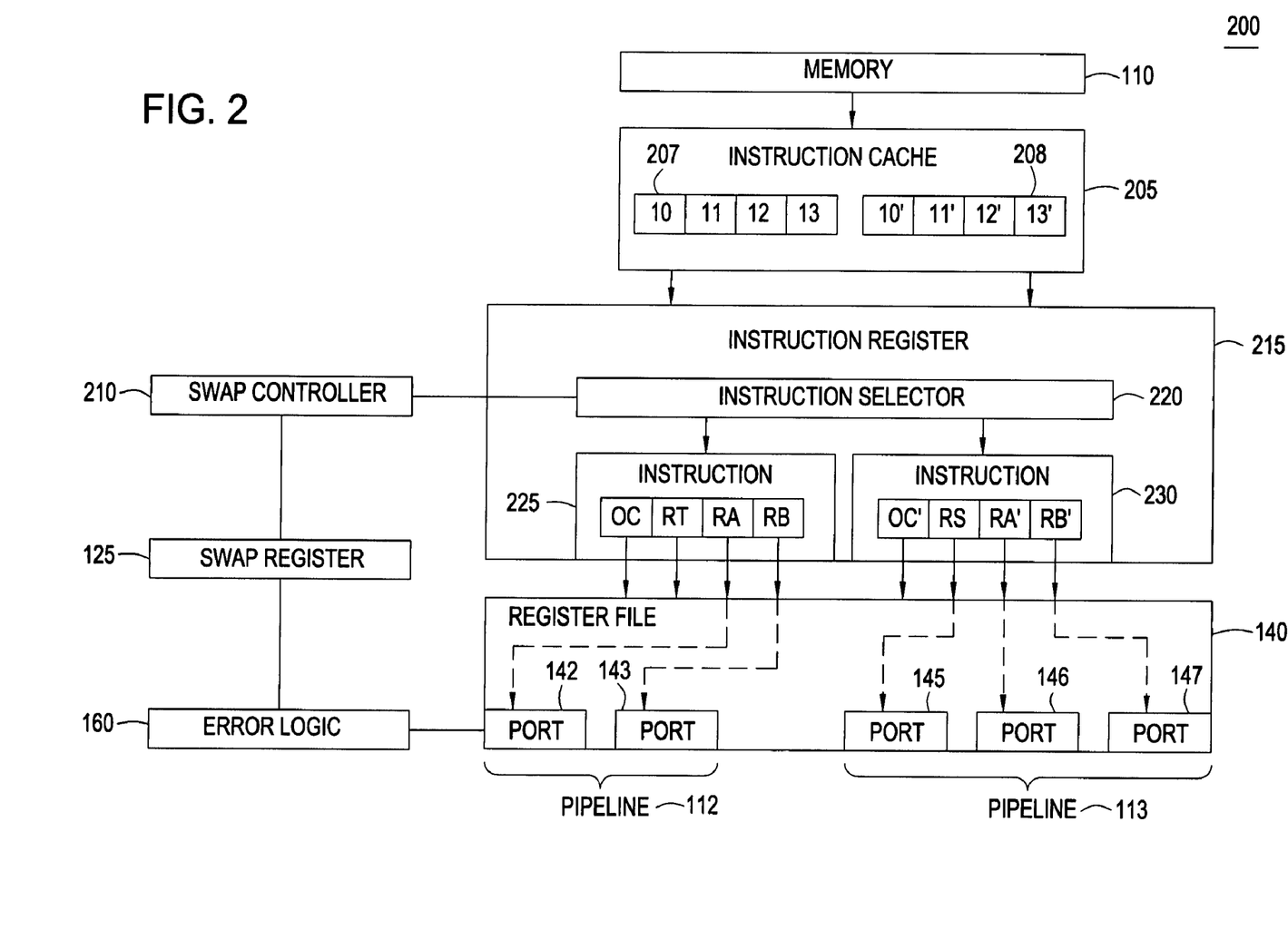
FIG. 2 depicts an alternative embodiment of the system described in FIG. 1 wherein instructions can be selected or reconfigured to use operational ports while instructions are being issued.

Referring now to FIG. 2, there is shown an embodiment of a system 200 for repairing ports as an alternative for system 100 of FIG. 1. For clarity, only a portion of system 100 is repeated to describe the differences between system 100 and system 200. The remainder of system 200 may perform in substantially the same way. In particular, swap register 125, register file 140, and error logic 160 may operate as described with reference to FIG. 1.

System 200 may include memory 110, pipelines 112 and 113, swap controller 210, swap register 125, and error logic 160. Pipelines 112 and 113 represent processing channels for a pair of instructions. In other embodiments, more pipelines may be implemented. Pipelines 112 and 113 may include instruction cache 205, instruction register 215, and register file 140.

Instruction cache 205 may receive instructions 207 and 208 from memory 110. Instruction 207 may include operands I0, I1, I2, and I3, and instruction 208 may include operands I0', I1', I2', and I3', wherein the primes are introduced to differentiate the pipeline associated with the instruction operands. I0, I1, I2, I3, may represent operands such as operand code (OC), read target (RT), read base address (RA), read index address (RB), not necessarily in that order, and I0', I1', I2', and I3' may represent operands such as OC', register to be stored (RS'), RA' and RB', not necessarily in that order.

In some of these embodiments, instructions from memory 110 may not all have three operands, impeding some swaps of operands. In such embodiments, instructions may be moderately reformatted and re-encoded into a generalized, e.g., 34-bit instruction format that always has three operands, or register address fields, in instruction cache 205. In other embodiments, pipelines may designed to handle instructions with more or less than three operands.

Instruction register 215 may couple with instruction cache 205 to decode instructions 207 and 208, re-ordering operands from a program order to an order to utilized by register file 140. Instruction register 215 may include instruction selector 220 and instructions 225 and 230.

Instruction selector 220 may couple with swap controller 210 to swap operands based upon the failure of one or more ports such as ports 142, 143, 145, 146, and 147. In FIG. 2, the operands of instructions 225 and 230 show the case in which none of the ports have failed or no operand swapping is required between instructions 207 and 208 to route necessary operands to functional ports. The operands of instructions 207 and 208 are re-arranged from program order into an order expected by register file 140 so instruction 225 includes operands OC, RT, RA, and RB, and instruction 230 includes operands OC', RS', RA', and RB'.

Figure 2A:
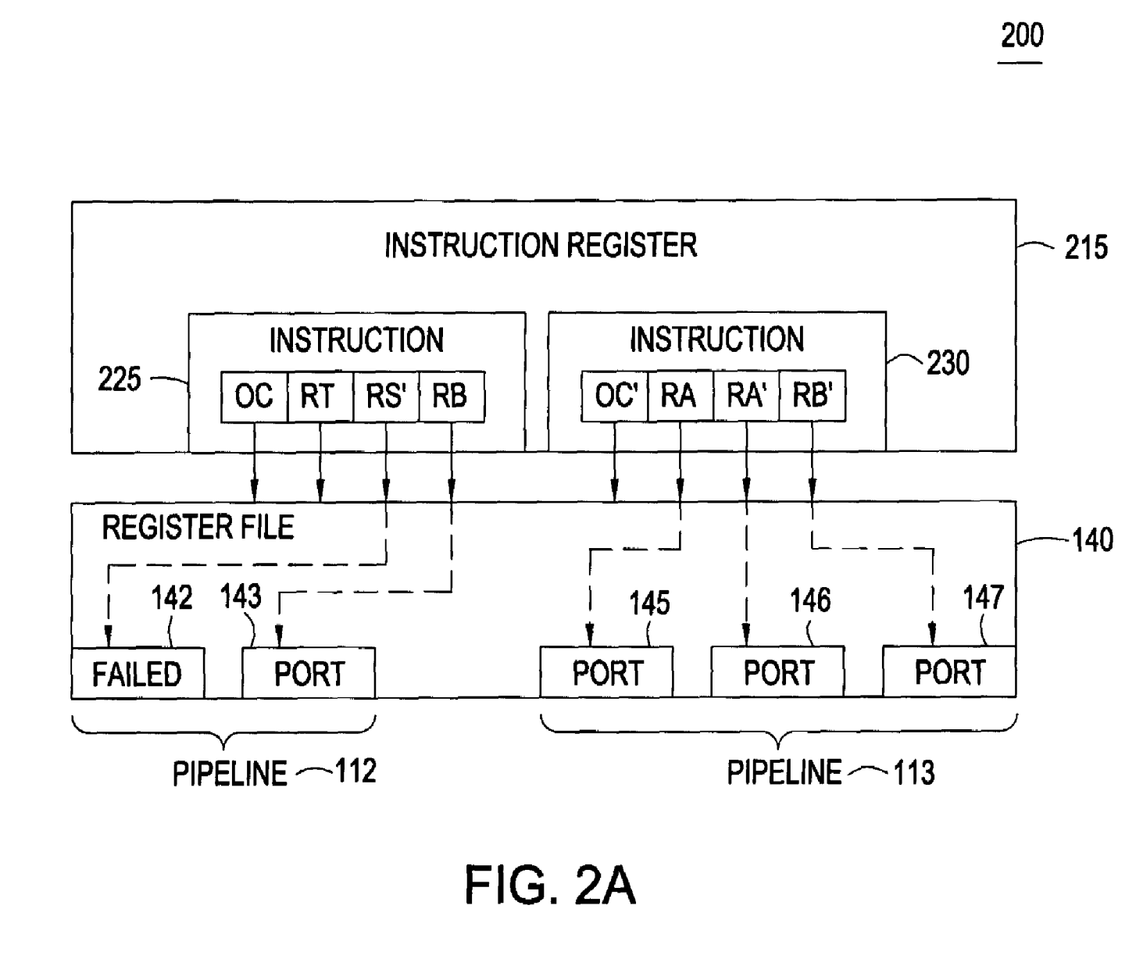
FIG. 2A depicts the alternative embodiment of the system described in FIG. 2 wherein operands of two instructions are swapped to use operational ports while instructions are being issued.

FIG. 2A, however, depicts a situation wherein either port 142 or port 145 has failed so operands RA and RS' have been swapped. For instance, 10 may include operand RA and 11'may include operand RS'. When swap controller 210 indicates that RA is to be swapped with RS' as a result of a failure of port 142, instruction selector 220 may store RS' in instruction 225 and RA in instruction 230 to route RS to execution unit 152 via port 145 as shown in FIG. 1. In other embodiments, swaps between other operands may be implemented to facilitate routing of operands via alternative ports.

On the other hand, when an instruction that requires, e.g., all three operands, and thus all three ports of pipeline 113 such as an X-form indexed store, instruction selector 220 may store the instruction in both pipelines 112 and 113, in effect, to steal the required third port for the store instruction. An X-form indexed store is an instruction in an instruction format supported by, e.g., a PowerPC™ processor that uses a third operand to identify a storage address for a LSU store operation to store data to cache such as cache 156. Similarly, when a load with update instruction of an effective address in pipeline 113 must be executed after a failure of a write port such as write port 192 shown in FIG. 1, the load and store instruction may be issued without a different instruction in parallel in pipeline 112 so that write port 190 may be utilized to output the result of the load and store from execution unit 154 shown in FIG. 1.

Figure 3:
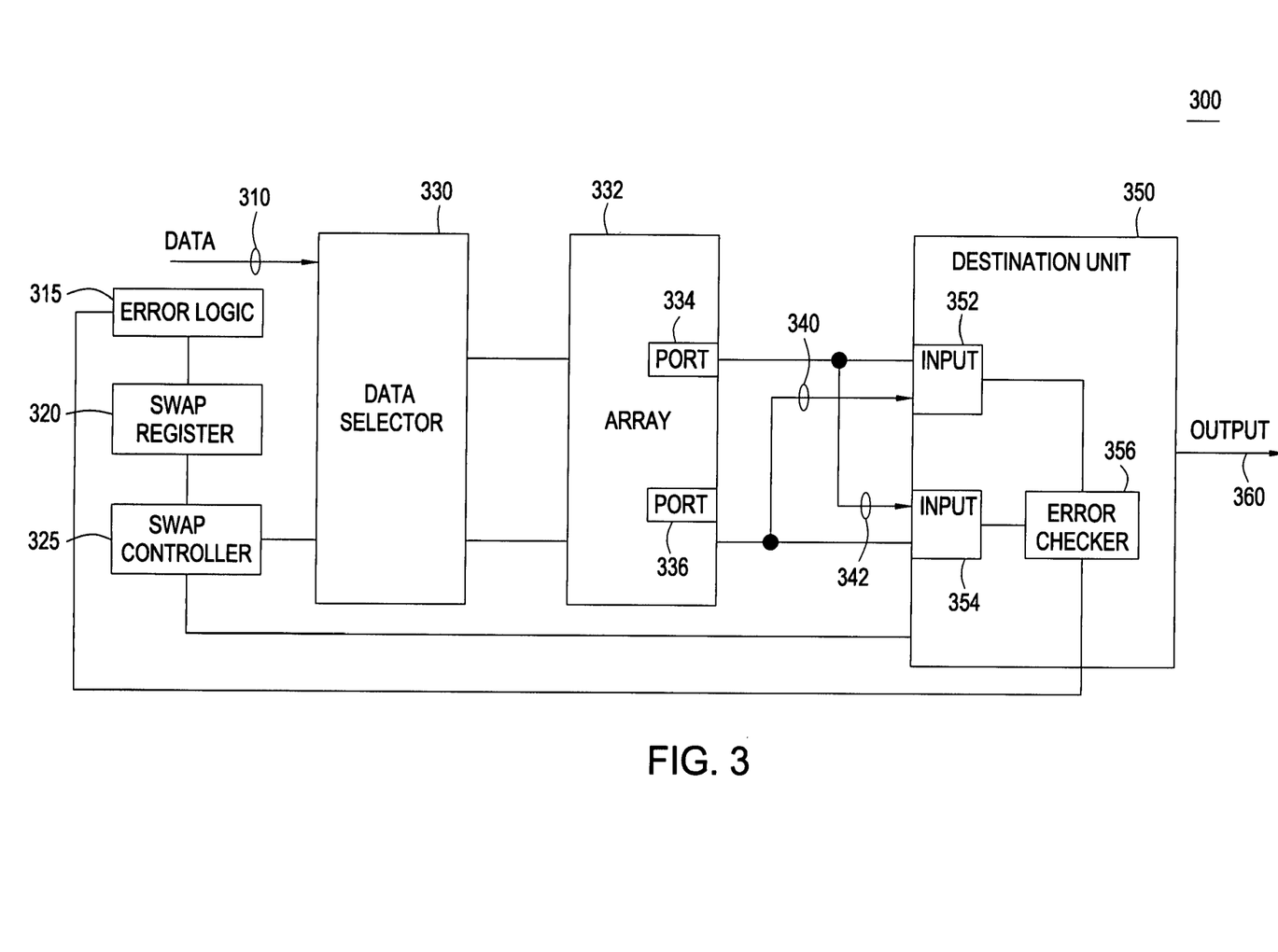
FIG. 3 is an embodiment of an apparatus having an array, a swap controller, and a swap register for repairing ports.

Referring now to FIG. 3, there is shown an apparatus 300 for repairing ports. Apparatus 300 may receive data 310 and selectively forward the data 310 and/or operands referenced to by data 310 to destination unit 350 via ports 334 and 336. For instance, apparatus 300 may be part of a differential memory array for porting more than one phase of data to a memory cell to store the data to facilitate singled-ended reads and writes and destination unit 350 may be the memory array. Ports 334 and 336 may apply two different phases of a write to the memory array. If port 334 fails, port 336 may advantageously output two different phases of the write to the memory array serially to perform the write, leaving the memory array functional although at half speed. Reads, on the other hand may still be accomplished as single-ended reads with little or no additional latency.

Apparatus 300 includes error logic 315, a swap register 320, a swap controller 325, a data selector 330, an array 332, and a destination unit 350. Error logic 315 couples with destination unit 350 to respond to an error detected in one of the ports by determining the port associated with the error and determining whether the error is the result of a hard failure.

When the port error results from a hard failure, error logic 315 sets a bit in swap register 320 to enter into a new mode of execution that bypasses the failed port. More specifically, the new mode of execution may include bypassing the failed port by re-routing data bound for the failed port to an alternative port. For example, when port 336 fails, error checker 356 of destination unit 350 may determine that erroneous data was received from port 336. Destination unit 350 may then communicate with error logic 315 to diagnose the error. When the error is uncorrectable, error logic 315 sets a bit associated with port 336 in swap register 320.

Swap controller 325 may determine the mode of operation for apparatus 300 based upon the contents of swap register 320 and coordinate new modes of operation as the contents of swap register changes. Each mode of operation may include a selecting a particular mix of instructions and/or a series of one or more swaps to route the instructions through operational ports in a manner that maximizes the use of available ports. In particular, swap controller 325 may monitor swap register 320 to determine when to implement changes in the utilization of ports 334 and 336, as well as changes to implement in data selector 330 to direct data 310 to appropriate ports. For example, in a first mode of execution, when both port 334 and 336 are operating properly, data selector 330 may transmit data bound for input 352 via port 334 and data bound for input 354 via port 336. On the other hand, when port 334 fails, the data bound for input 352 may be routed to input 352 via port 336 and alternative port path 340. Alternatively, when port 336 fails, data bound for input 354 may be routed through port 334 to input 354 via alternative port path 342.

Data selector 330 may include issue and dispatch logic to dispatch data 310 to array 332 in an order in which array 332 is configured to receive data 310, or in an order that directs operands of data 310 to operational ports. In a first mode of operation, data selector 330 may select data from data 310 and/or data from array 332 to transmit to destination unit 350 via ports 334 ad 336. On the other hand, after receiving a signal from swap controller 315, data selector 330 may switch to a second mode of operation. In the second mode of operation, data and instructions of data 310 may be routed through port 334 or 336 to inputs 352 and 354.

Array 332 may be any type of multi-port array, such as a register file of a processor (DSP, FPU, etc.) for storing and transmitting data 310 to appropriate inputs of destination unit 350. More specifically, array 332 may store data and instructions in a number of registers for execution by execution units such as destination unit 350. For example, array 332 may receive an instruction via data selector 330, locate data corresponding to the instruction from within array 332, and distribute the data to port 334 and the instruction to port 336, or vice versa. In some embodiments, array 332 may receive data representing a base address and an index, forward the base address and index to destination unit 350 to generate an address, load the data located at the generated address, and forward the data obtained from the generated address and the corresponding instruction to another destination unit.

Array 332 may include ports 334 and 336. Ports 334 and 336 may include buffers for transmitting data to destination unit 350 with error detection data such as parity bits or checksums. For instance, when transmitting data to destination unit 350, array 332 may attach a checksum, generated based upon the transmitted data. The error checker 356 may then generate a checksum on the data received via inputs 352 and compare it to the transmitted checksum. A mismatch in checksums indicates an error in the transmitted data, possibly due to a port failure. In response to a mismatch. error logic 315 may initiate diagnostics to determine the nature of the error.

Alternative port paths 340 and 342 couple the outputs of ports 334 and 336 to both inputs 340 and 342 to facilitate reparation of ports. In particular, alternative port path 340 couples port 334 with input 354 so that data bound for input 354 may be output via port 334. Similarly, alternative port path 342 couples port 336 with input 352 so that data bound for input 352 may be output via port 336.

Destination unit 350 may be an execution unit such as a FXU, FPU, and ALU, a memory array, or another type of unit to process data and/or instructions. Destination unit 330 may be configured to receive data or instructions for input 354 via port 336 in a first mode of operation. In a second mode of operation that is initiated in response to a signal from swap controller 325, destination unit 350 may be designed to receive data and/or an instruction for input 354 via alternative port path 330 or data and/or an instruction for input 352 via alternative port path 332. Destination unit 350 may then process the data and/or instructions and forward the result to output 360.

Figure 4:
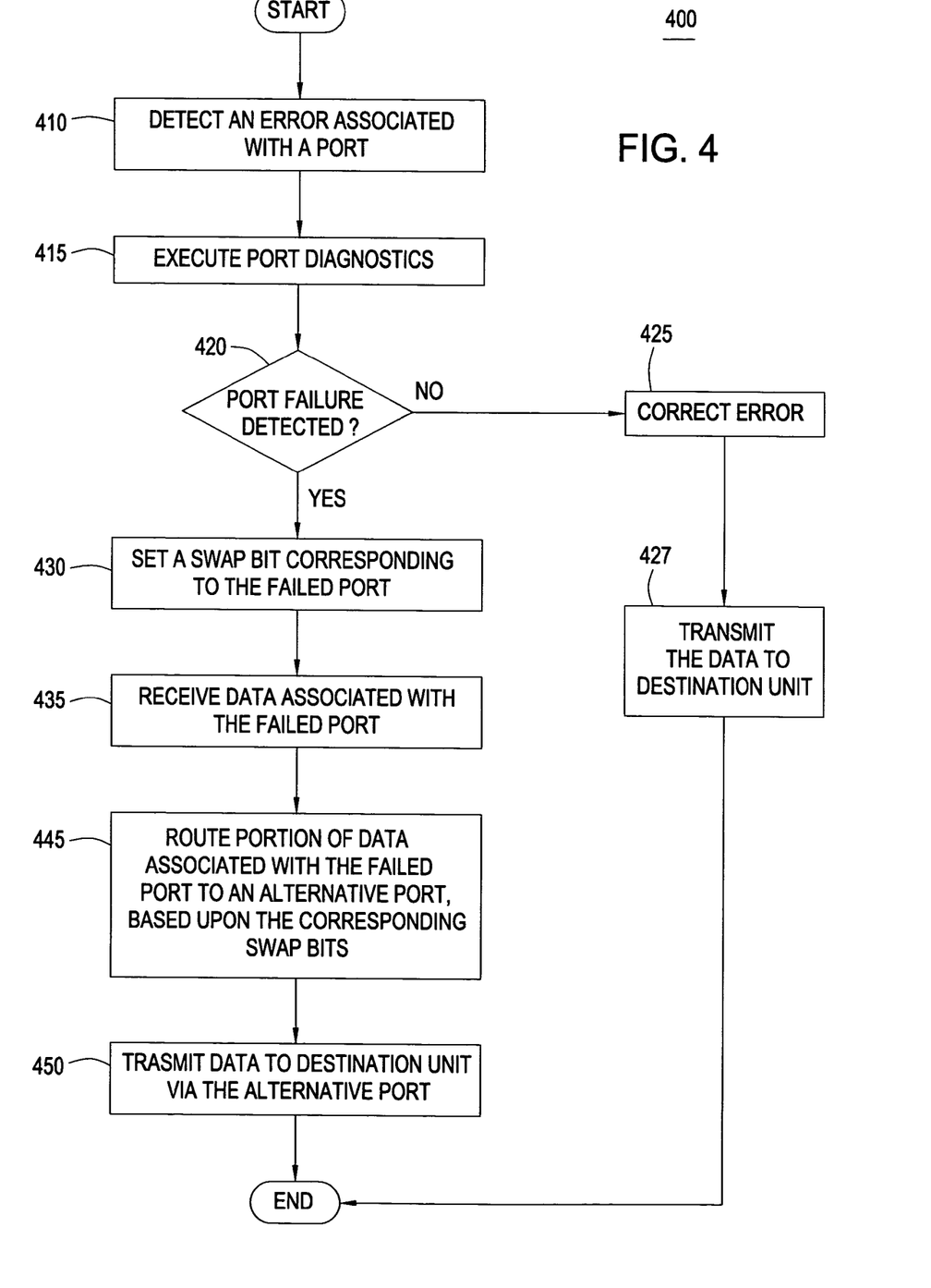
FIG. 4 depicts an example of a flow chart for a method to repair ports.

FIG. 4 depicts an example of a flow chart 400 for a method for repairing ports, for example, utilizing the techniques and apparatus described above. The method begins with step 410 by detecting an error associated with a port. For example, when an execution unit receives data or an instruction from a corresponding port in a register file, the execution unit may include error detection logic to check for parity errors. When a parity error occurs, error logic, or the software machine check error handler routine, may execute an integer unit diagnostic, run-time routine in step 415 to determine what port had a failure and whether the error is a soft error, a correctable hard error, or an uncorrectable hard error.

When the diagnostic routine determines that the error is correctable, the error is corrected in step 425 and instructions continue to be transmitted via the ports of the register file in step 427. On the other hand, when the diagnostic routine determines that the integer register file had an uncorrectable hard error on a single port of the register file, the error logic enters a swap repair by setting an appropriate swap register bit in step 430 to change the mode of operation of corresponding pipelines.

Each repairable port has a corresponding swap bit, which, when enabled, will cause a swap controller to select instruction pairs that can be transmitted to execution units through the number of operational ports and/or selectively swap register addresses in the dispatch stage of a pipeline accordingly. Thus, when data associated with the failed port is received (step 435), the swap controller determines the swap bits associated with one or more ports that are set and routes the corresponding instruction operands to alternative ports in step 445. In some embodiments, the swap controller may be configured to review the content of the swap register as a whole to determine, based upon the pattern of bits, the mode of operation and, thus, the combinations of compatible instruction pairs and the register addresses to swap for route the corresponding operands to alternative ports. In other embodiments, number of swap bits set may indicate the number of operational ports and each swap bit may correspond to a swap in the order of the operands to forward to the register file.

In step 450, the data and/or instruction operands are transmitted to the destination unit. For example, in a mode of operation corresponding to all the ports of a register file operating properly, the instruction operands are forwarded to the destination unit via all the ports of the register file. On the other hand, when one or more ports have failed, another mode of operation is implemented. Operands may then be transmitted to the destination unit via alternative ports and alternative port paths interconnecting the alternative ports to the corresponding inputs of the destination unit, based upon register address swaps implemented by the swap logic.

While the foregoing is directed to embodiments of the present invention, other and further embodiments of the invention may be devised without departing from the basic scope thereof, and the scope thereof is determined by the claims that follow.

What is claimed is:

1. An apparatus for repairing ports of an array to execute instructions, the apparatus comprising:
    error logic to determine if a first port of the ports fails;
    a swap controller responsive to the error logic to selectively move a first operand to a position of a second operand within the instructions, the position of the second operand being associated with a second port of the ports via the array, to selectively route the first operand and the second operand to the second port depending upon if the first port fails and when execution of at least one of the instructions depends upon transmission of the first operand from the array; and
    a selector coupled with the ports, being responsive to the swap controller to selectively receive the first operand from the first port via a first port path and the first operand from the second port via an alternative port path, to execute the instructions.

2. The apparatus of claim 1, further comprising more than one execution units coupled with the selector, wherein the more than one execution units are configured to execute more than one of the instructions in parallel.

3. The apparatus of claim 1, further comprising a swap register coupled with the error logic and the swap controller, to maintain a bit to indicate that the first port failed.

4. The apparatus of claim 3, wherein the bit is set by the error logic to indicate an uncorrectable, hard error associated with the first port.

5. The apparatus of claim 3, wherein the swap register comprises more than one bits to implement more than one mode of operation for the ports.

6. The apparatus of claim 3, wherein the swap controller routes a first instruction of the instructions in parallel through two pipelines, to route the first operand to the second port.

7. The apparatus of claim 1, wherein the error logic executes an error handler routine to determine if the first port has failed.

8. The apparatus of claim 1, wherein the swap controller swaps positions of the first and second operands of two of the instructions, the two instructions to be executed in parallel, to route the first operand to the second port.

9. The apparatus of claim 8, wherein the swap controller swaps the first operand with the second operand before issuing the instructions to an instruction cache.

10. The apparatus of claim 8, wherein the swap controller swaps the first operand with the second operand while the instructions are being issued to an instruction register.

11. An apparatus for repairing ports for a differential memory array, the apparatus comprising:
  error logic to determine if a first port of the ports fails;
  a swap controller responsive to the error logic to selectively route a first phase bit and a second phase bit consecutively to a second port of the ports, depending upon if the first port fails and when execution of an instruction associated with the first phase bit and the second phase bit depends upon transmission of the first phase bit to a memory cell; and
  a selector coupled with the ports, being responsive to the swap controller to selectively receive the first phase bit from the first port via a first port path and the first phase bit from the second port via an alternative port path, to execute the instruction.

12. The apparatus of claim 11, further comprising a differential memory array coupled with the first port and the second port, configured to receive the first phase bit via the first port, the second phase bit from the second port and responsive to the swap controller to receive the both phase bits serially via at least one of the ports.

13. The apparatus of claim 12, wherein the differential memory array is configured to perform a single-ended read based upon the second phase bit from the second port when after the first port fails.

14. A system, comprising:
  memory to store instructions;
  a register file coupled with the memory to receive the instructions for execution, wherein the register file comprises a first port to transmit a first operand of the instructions and a second port to alternate between transmitting a second operand of the instructions and the first operand, based upon positions of the operands in the instructions;
  error logic to determine if the first port failed;
  a swap controller coupled with the error logic configured to route the instructions through more than one pipelines for parallel execution, select at least one of the instructions and position operands within the at least one of the instructions, and route the first operand to the second port, in response to a failure of the first port as indicated by the error logic; and
  an execution unit coupled with the first port via a first port path and the second port via an alternative port path, wherein the execution unit receives the first operand from the second port via the alternative port path when the first operand is routed to the second port.

15. The system of claim 14, further comprising another execution unit coupled with the second port via the second port path, to receive the second operand.

16. The system of claim 14, wherein the alternative port path facilitates execution of at least two of the instructions in parallel when the first port fails by transmitting the first operand from the second port to the execution unit when execution of at least two instructions depend upon transmission of the first operand and not the second operand.

17. The system of claim 14, wherein the first execution unit couples with the first port and the second port via a port selector, the port selector being responsive to the swap controller to select and forward the first operand to the execution unit via the first port path and the alternative port path.

18. The system of claim 14, wherein the swap controller routes a first instruction of the instructions through at least two pipelines of the more than one pipelines, the first instruction having the first operand.

19. The system of claim 14, wherein the swap controller selectively swaps the positions of the operands in the instructions to alternatively route the first operand and the second operand to the second port and from the second port to the execution unit via the alternative port path and the second port path, in response to a failure of the first port.

20. The system of claim 19, wherein the swap controller selectively swaps the positions of the operands when the instructions are being dispatched to an instruction register.

21. The system of claim 19, wherein the swap controller selectively swaps the positions of the operands as the instructions are stored in an instruction cache.

22. A method for repairing ports of an array, the method comprising:
  monitoring transmission from a first port of the ports to detect a failure of the first port;
  selectively routing a first operand bound for the first port to a second port of the ports in response to detecting the failure of the first port when execution of an instruction associated with the first operand depends upon receipt of the first operand by a first destination unit;
  transmitting the first operand from the second port to the destination unit via an alternative port path; and
  transmitting a second operand from the second port to a second destination unit via a second port path.

23. The method of claim 22, wherein monitoring comprises detecting the failure of the first port and initiating a diagnostic routine to determine that the failure is an uncorrectable, hard error.

24. The method of claim 22, wherein selectively routing comprises setting a swap bit, in response to the failure of the first port, and modifying the instruction before the instruction is transmitted to the array, to direct the first operand to the second port via the array.

25. The method of claim 24, wherein modifying the instruction comprises swapping positions of the first operand and the second operand within the instruction.

26. The method of claim 24, wherein modifying the instruction comprises swapping positions of the first operand and the second operand, wherein the first operand is positioned within the instruction and the second operand is positioned within a different instruction to be executed in parallel with the instruction via the array.

27. The method of claim 22, wherein selectively routing comprises routing the first operand and the second operand of the instruction in series to the destination unit via the second port.

* * * * *